(12) United States Patent
Fries et al.

(10) Patent No.: US 10,369,499 B2
(45) Date of Patent: Aug. 6, 2019

(54) FILTER DEVICE AND FILTER ELEMENT

(71) Applicant: RT-FILTERTECHNIK GMBH, Friedrichshafen (DE)

(72) Inventors: Uwe Fries, Jena (DE); Carsten Grobe, Weimar (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 0 days.

(21) Appl. No.: 15/564,218

(22) PCT Filed: Jan. 29, 2016

(86) PCT No.: PCT/EP2016/000150
§ 371 (c)(1),
(2) Date: Oct. 4, 2017

(87) PCT Pub. No.: WO2016/165797
PCT Pub. Date: Oct. 20, 2016

(65) Prior Publication Data
US 2018/0126305 A1    May 10, 2018

(30) Foreign Application Priority Data

Apr. 14, 2015  (DE) ......................... 10 2015 004 795

(51) Int. Cl.
*B01D 29/23* (2006.01)
*B01D 29/92* (2006.01)
*B01D 35/027* (2006.01)

(52) U.S. Cl.
CPC .......... *B01D 29/237* (2013.01); *B01D 29/23* (2013.01); *B01D 29/925* (2013.01); *B01D 35/027* (2013.01); *B01D 2201/0423* (2013.01)

(58) Field of Classification Search
None
See application file for complete search history.

(56) References Cited

U.S. PATENT DOCUMENTS 3,199,679 A      8/1965  Salyer, Jr.
3,342,021 A  *  9/1967  Yelinek .................. F02M 35/14
                                                         210/304

(Continued)

FOREIGN PATENT DOCUMENTS

DE          38 12 136        2/1989
DE    20 2005 014 690   *   3/2007

(Continued)

OTHER PUBLICATIONS

International Search Report dated Apr. 22, 2016 in International Application No. PCT/EP2016/000150.

*Primary Examiner* — Benjamin M Kurtz
(74) *Attorney, Agent, or Firm* — Wenderoth, Lind & Ponack, L.L.P.

(57) ABSTRACT

A filter device, especially intended for incorporation into a fluid reservoir tank, has at least one, preferably exchangeable, filter element (18) having element material (20) through which a fluid can flow from the inside outward, viewed in radial direction, and encompassed by a support tube (36) with passage orifices. The support tube is surrounded with a fluid flow space defined by a housing wall of a housing and has a plurality of passage sites. At least some of the passage orifices in the support tube (36) of the filter element (18) have a flow-directing device (80) that impart a flow direction other than the radial flow direction to the fluid.

10 Claims, 7 Drawing Sheets

(56) References Cited

U.S. PATENT DOCUMENTS 3,406,832 A * 10/1968 Ruschman ............. B01D 27/00
                                                              210/457
2011/0056875 A1* 3/2011 Stehle .................. B01D 29/605
                                                             210/172.1

FOREIGN PATENT DOCUMENTS

| EP | 2 249 941 | 11/2010 |
| WO | 2009/096879 | 8/2009 |
| WO | 2009/109212 | 9/2009 |
| WO | 2012/077048 | 6/2012 |
| WO | 2014/165606 | 10/2014 |

* cited by examiner

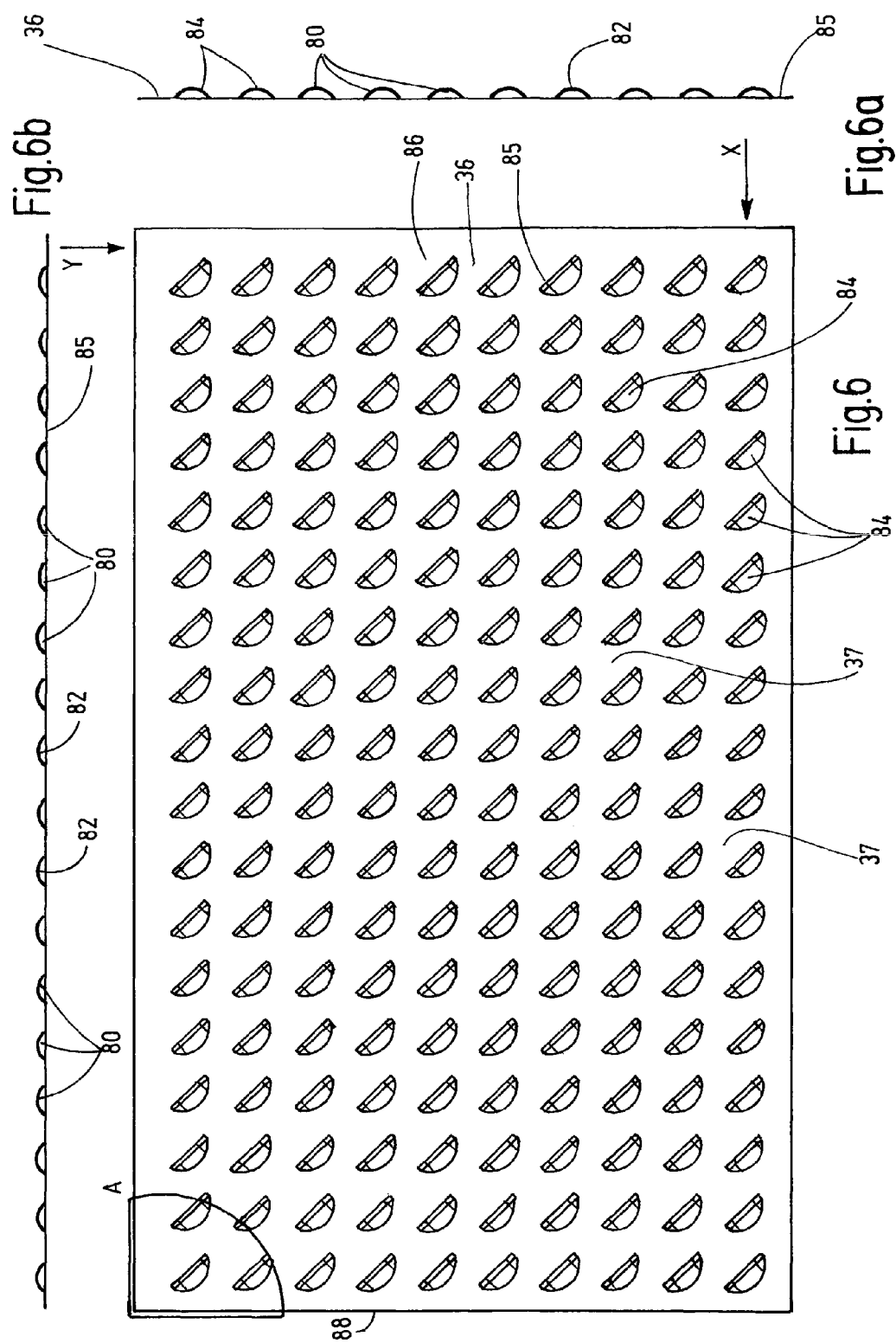

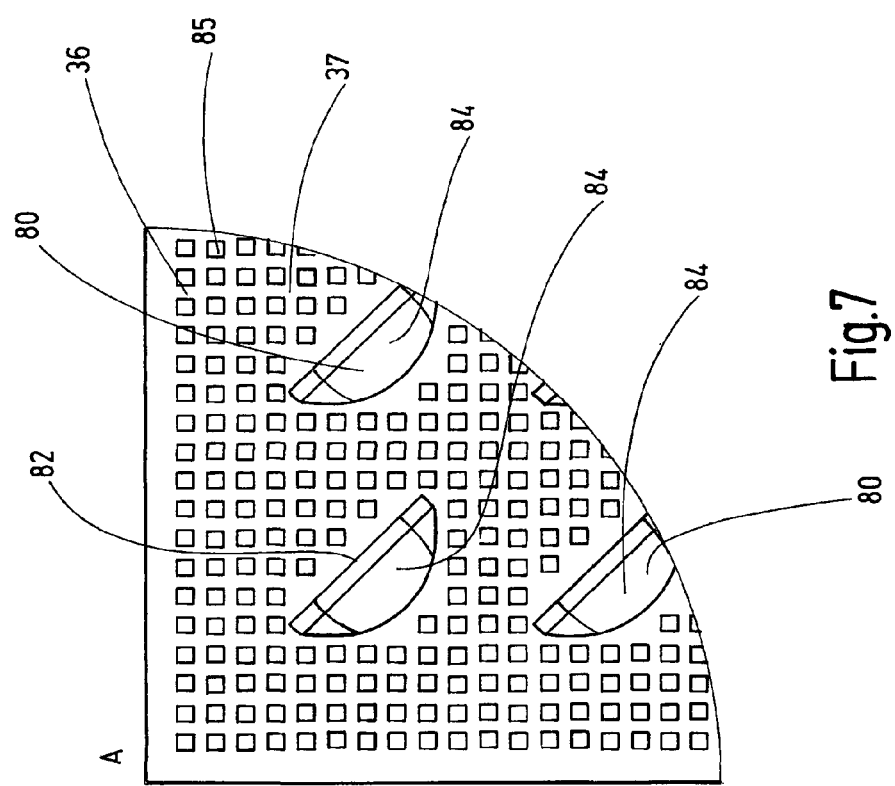

FILTER DEVICE AND FILTER ELEMENT

BACKGROUND OF THE INVENTION

During filtration with such in-tank filter devices, in the case of high working pressure and/or large fluid volumes when the fluid to be cleaned passes through the filter element, splashing and foam formation occurs. The foam formation produced by gas bubbles, in particular air bubbles, in the hydraulic working circuit preceding the fluid supply tank can reach the fluid, in particular in the form of hydraulic oil. Such a foam formation in the fluid occurs in particular when such filter devices are used for mobile machines, such as diggers, wheeled loaders or telescopic loaders, etc., which are provided with corresponding working hydraulics, for example in the form of hydraulic cylinders that can be actuated and supplied by means of pumps. To prevent the fluid that splashes out of the filter element and that is subject to foam formation from coming into direct contact with the other fluid volume or oil volume in the supply tank, in the known solutions, the filter elements are enclosed in corresponding encasing housings inside the tank. Each encasing housing forms a kind of presettling space or pre-chamber, in which the cleaned fluid can come to rest and any gas bubbles can be discharged upwards as a result of buoyancy. However, these settling chambers take up a relatively large installation space inside the actual tank volume and ultimately then result in a supply tank that has a large overall design. In particular in the case of the high working pressure and/or the very large volumes of fluid to be filtered, the pre-chamber volumes are often insufficient to bring about to an adequate extent a settling of the oil and an air outflow before output into the actual supply tank.

As part of the modern downsizing in such mobile machines with the retention of the performance of the hydraulic system, a size reduction of technical system parts such as the tank volumes also necessarily takes place so that the input times and settling times for the fluid in the tank are necessarily reduced, which is in turn accompanied by increased foam formation.

In order to deal with such foam formation, solutions have already been proposed in the prior art, for example in the form of EP 2 249 941 B1, which relates to a generically formed filter device and filter element. In this known solution, the plurality of passage points of the housing wall are partially arranged below a respective changeable fluid level in the supply tank and the other portion of the passage points is arranged above this fluid level. Because, in the known solution, the respective passage points are additionally part of at least one screen structural layer or grid structural layer, which covers passage regions arranged in the housing wall that are preferably window-shaped, and because the free opening cross sections for the passage points of the housing wall are selected such that any gas bubbles located in the cleaned fluid can be separated at the perforated housing wall and/or can be collected for a discharge close to the fluid level, the fluid entering into the fluid flow space and cleaned by the respective element material flows in the region of the respective fluid level and above same in a laminar manner via the assignable passage points into the supply tank. The undesirable splash formation or foam formation when the fluid flows out into the supply tank is then reliably prevented.

Due to the pressure difference between the inflowing, not cleaned fluid and the flowing off, cleaned fluid, the cleaned fluid can be raised in the fluid flow space via the fluid level in the tank with uniform distribution along the inner side of the housing wall with the passage points. With capillary effects also being able to contribute thereto, the created uniform fluid film then permits the splash- and foam-free outlet from the passage points transverse to the housing wall.

For the known filter device, a filter element is used in a preferably exchangeable manner, in which a pleated element material for cleaning the particulate contamination from the fluid extends between two end caps. The element material is enclosed by a support tube that, in order to increase the pressure stability of the element material, supports the element material towards or on the outside. This support sleeve or tube has corresponding passage openings in the form of perforations, which allow the fluid to pass from the inside to the outside firstly through the element material and then through the support tube of the filter element in the radial outlet direction.

SUMMARY OF THE INVENTION

On the basis of the above-mentioned prior art, the problem addressed by the invention is to further improve the known solution such that an increased air output from the fluid, in particular in the form of hydraulic medium, is obtained in a fluid supply tank.

This problem is basically solved by a filter device having and a filter element having at least a portion of the passage openings in the support tube of the filter element with a flow guide. The flow guides provide the fluid with a flow direction that is different from the radial flow direction through the filter element. This difference in flow direction results in improved removal of the air content, including in the bubble form, from the fluid to be filtered, in particular in the form of hydraulic oil. In addition, by the respective flow guide, the coalescability for the air bubbles or air droplets inside the fluid is increased, which then join together to form larger bubbles or drops due to their surface tension. In turn, the joining allows, due to their buoyancy behavior, an improved discharge of the collected air from the fluid into the environment, in that the air discharge occurs in an unforced manner via the respective fluid level into the above-situated air space of the fluid supply tank.

In addition, the targeted fluid flow, brought about by the respective flow guide, means that no type of short circuit occurs in front of or behind the support tube. Rather, in any case, the air volumes existing between the outer side of the pleated element material and the facing inner side of the support tube can also be discharged in a defined manner via the flow guide. In the region of the respective flow guide and its respective discharge opening in the form of a free opening cross section, an acceleration of the fluid can also occur with an establishing swirl flow about the filter element with the support tube. An increased and improved air output from the fluid can then take place. Directing the swirl flow counterclockwise about the filter element, with all of the flow guides preferably having to face in the same direction with their free opening cross sections, adavantageously does not impede the air outlet from the fluid medium as a result of undesirable turbulence. However, it is also very possible to select the reverse swirl direction, in other words, in the clockwise direction.

It has also been proven to be particularly advantageous if the respective flow guide of the support tube delimits the associated free opening cross section in such a way that the flow guide is inclined relative to the longitudinal axis of the filter element by 10° to 80°, preferably by approximately 30° to 60°, particularly preferably by approximately 45° This inclination has a positive effect on the swirl flow to be obtained about the filter element. The respective flow guide is formed from the material of the support tube and is shaped projecting outwards as a flow pocket. The top edge of the flow pocket delimits the opening cross section for the fluid discharge of the flow guide. The flow guide is then formed, stamped out or cut out in the manner of a pocket from the support tube sleeve from the inside outwards, permitting a particularly cost-effective production of the support tube, and thus, of the filter element as a whole.

In one particularly preferred embodiment of the filter device according to the invention, in addition to the respective flow guide, the support tube has additional passage openings, which surround the respective flow guide in groups. The total of the free opening cross sections of the flow guides is preferably smaller than that of the passage openings in the support tube. While the flow guides with their free opening cross sections produce the swirl flows about the filter element, the other passage openings in the form of a perforation in the support tube still ensure that the fluid passes through the support tube in the radial direction from the inside outwards to help prevent undesirable pressure increases on the inside of the support tube, which undesirable pressure increases could otherwise compromise the free filtration through the pleated element material. It has also been proven to be advantageous to group both the flow guides of the support guide and the other radial passage openings in groups and at defined distances relative to one another around the support tube.

The subject matter of the invention is also a filter element, in particular intended for such a filter device, having an element material extending between two end caps, which element material is enclosed by a support tube with passage openings. Improved air output values are able to be achieved with this filter element, provided that at least a portion of the passage openings in the support tube of the filter element have a flow guide, which provide the fluid with a flow direction that is different from the radial flow direction through the support tube.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure and that are schmatic and not to scale:

FIGS. 6, 6a, b are a top view an end view and a side view, respectively, of an uncoiled support tube sleeve according to a second exemplary embodiment of the invention; and FIG. 7 is an enlarged top view of the circle section identified in FIG. 6 with the reference A.

DETAILED DESCRIPTION OF THE INVENTION

Figure 1:
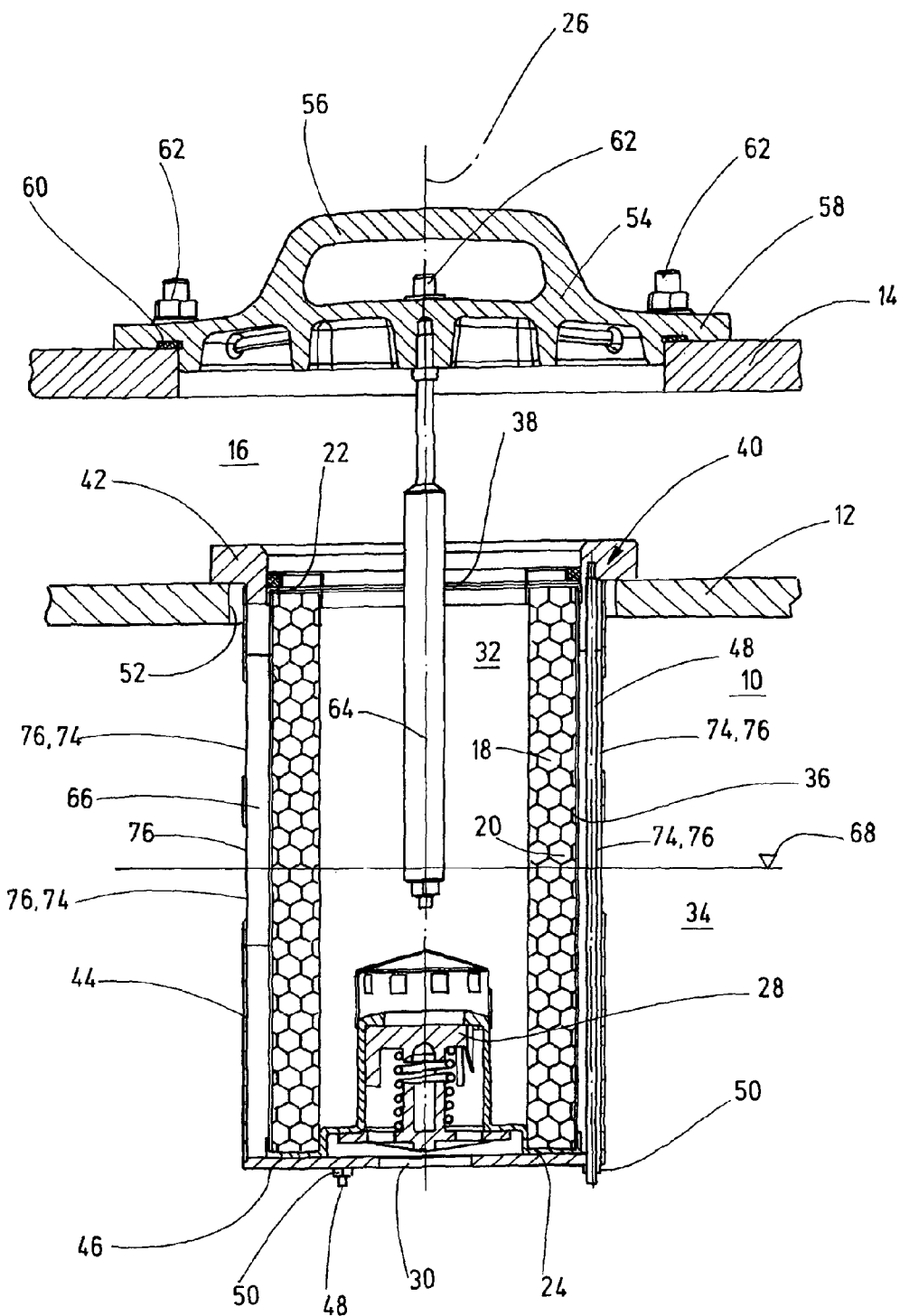
FIG. 1 is a side view in section of a filter device according to an exemplary embodiment of the prior art.

The filter device shown in longitudinal section in FIG. 1 serves for installation in a reservoir fluid supply tank 10, comparable with the installation situation according to EP 2 249 941 B1. Of the fluid supply tank 10, the depiction of FIG. 1 depicts only the top tank wall 12 and an associated receiving wall 14 for the attachment of the filter device as a whole. A similar installation situation for filter elements and filter devices is also disclosed in EP 1 419 807 B1. Extending between the depicted wall sections 12, 14 is an inlet channel 16 for fluid frequently contaminated with particles, for example from the hydraulic circuit of the working hydraulics of a construction machine or the like, which is not depicted in detail. The filter device also has a filter element 18 with a preferably pleated filter mat as the element material 20. Otherwise, the filter element 18 substantially forms a type of circular hollow cylinder. The element material 20 is guided or extends between a top end cap 22 and a bottom end cap 24 as parts of the filter element 18. The bottom end cap 24 has, centrally and extending coaxial to the longitudinal axis 26 of the filter device, a bypass valve 28 that is conventional per se, that opens in the case of an element material mat 20 is clogged with particulate contamination and that, with bypassing of the element material 20, allows the fluid to flow off uncleaned via a bottom bypass opening 30 into the supply tank 10.

Because the element material 20 is flowed through from the inside to the outside in the radial direction. In other words, the throughflow takes place from the inner side 32 of the filter element 18 in the direction of the inside 34 of the fluid supply tank 10. The element material 20 is enclosed by a sleeve-shaped support tube 36 for the purpose of reinforcement towards the outside, which support tube is preferably likewise formed circular cylindrical and has corresponding passage openings 37. In the prior art, the passage openings are formed as a perforation in the support tube 36 (cf. FIG. 2). These passage openings 37 in the support tube 36 serve for passage of the fluid cleaned from the element material 20. A correspondingly formed support sleeve (not depicted) could however in principle also follow the outer contour of the pleated element material 20 and to this extent realize the support for the purpose of increasing the pressure stability of the element towards the outside. Such a support sleeve would then also have corresponding passage openings for the fluid medium. The fluid inflow of the uncleaned fluid, coming from the inlet channel 16, takes place via the top inflow opening 38 of the filter element 18 in the direction of the inner side 32 of the filter element.

The filter element 18 is housed in a housing 40 having a flange-shaped broadening 42 on its top sidesupporting the filter device in this region on the top side of the top tank wall 12. A cylindrical housing wall 44 is in turn connected in a downward direction to said broadening 42, which cylindrical housing wall is formed closed in a pot-shaped manner towards its bottom side 46, up to the bypass opening 30. This bottom side 46 of the housing wall 44 preferably to this extent forms a separate base part. The housing wall 44 is supported with its respective free end on a shoulder-shaped step of the base part 46 and on the flange-shaped broadening 42. In order that the described composite structure of the housing 40 remains in the assembly depicted in FIG. 1, on the external circumference side relative to the element material 20 with the support tube 36 supporting rods 48 are arranged, of which only one supporting rod 48 is fully depicted in Fig. Of the two other inserted supporting rods 48, for the sake of simplicity, only one additional rod 48 is shown in FIG. 1 with its bottom final end, which projects below the bottom side of the base part 46. In this region, the respective supporting rod 48 is screwed via a threaded nut 50, and the top end of the respective supporting rod 48 is screwed in in a fixed manner via a corresponding internal thread into the flange-shaped broadening 42. The housing wall 44 can then be fixed between the broadening 42 and the base part 42 under a set pretensioning.

In order that the housing 40 can be inserted into the top tank wall 12, a corresponding circular cylindrical recess 52 is introduced into the top tank wall. The diameter of the recess 52 is in any case larger than the external diameter in the region of the transition between the flange-shaped broadening 42 and the external circumference of the housing wall 44. Furthermore, a cover part 54 is provided as part of the filter device with a handle 56 for simpler installation and removal of the filter device in the depicted tank 10. The cover part 54 has a shoulder-shaped broadening 58, which projects on the top side of the receiving wall 14, and a shoulder of the broadening 58 engages in the free internal diameter of the receiving wall 14 while contacting on same. An annular sealing element 60 of standard design serves for fluid sealing in this region. Fixing screws 62 lying opposite each other are provided and arranged diametrical to the longitudinal axis 26, which fixing screws serve for fixing of the cover part 54 to the receiving wall 14. Once the screws 62 have been loosened, the filter device can be removed from the tank 10 and reinstalled in the reverse mounting sequence. These mounting operations are necessary if a used filter element 18 is to be replaced with a new element.

A magnetic rod 64 extends concentric to the longitudinal axis 26 inside the filter device, which magnetic rod in particular has the function of a permanent magnet and which, viewed in the viewing direction of FIG. 1, is fixed with its top end in the cover part 54, and is in particular screwed therein Its other opposite free end penetrates the inner side 32 of the filter element 18. This magnetic rod 64 permits a separation of magnetizable metal components in the fluid to be filtered. Both the magnetic rod 64 and the bypass valve 28 are optional and do not necessarily have to be provided for the functioning of the filter device as a whole.

As is additionally shown in FIG. 1, the cylindrical housing wall 44 occupies a settable radial distance relative to the external circumference surface of the filter element 18, so that to this extent a fluid flow space 66 is formed. This fluid flow space 66 extends parallel to the external circumference surface of the filter element 18. In particular, it extends in the axial longitudinal direction parallel to the longitudinal axis 26 of the device between the top side of the base part 46 and the bottom side of the flange-shaped broadening 42. Furthermore, the fluid flow space 66 is substantially delimited towards the outside by the housing wall 44 and towards the inside by the external circumference surface of the element material 20 in the form of the filter mat. If the sleeve-shaped support tube 36 is used for the element material 20, this external circumference surface forms the boundary for the fluid flow space 66.

In the exemplary embodiment according to FIG. 1, a fluid level 68 inside the supply tank 10 is shown, and the filter element 18, and the fluid flow space 66 lies partially below the level 68 and partially above same. Depending on the volume of fluid to be cleaned flowing in via the inlet channel 16 or the volume flowing off required for the working hydraulics (not depicted), the fluid level 68 changes relative to the shown current position in FIG. 1. The fluid flow space 66 is otherwise not compromised from its flow space up to the penetration of the individual supporting rods 48.

Figure 2:
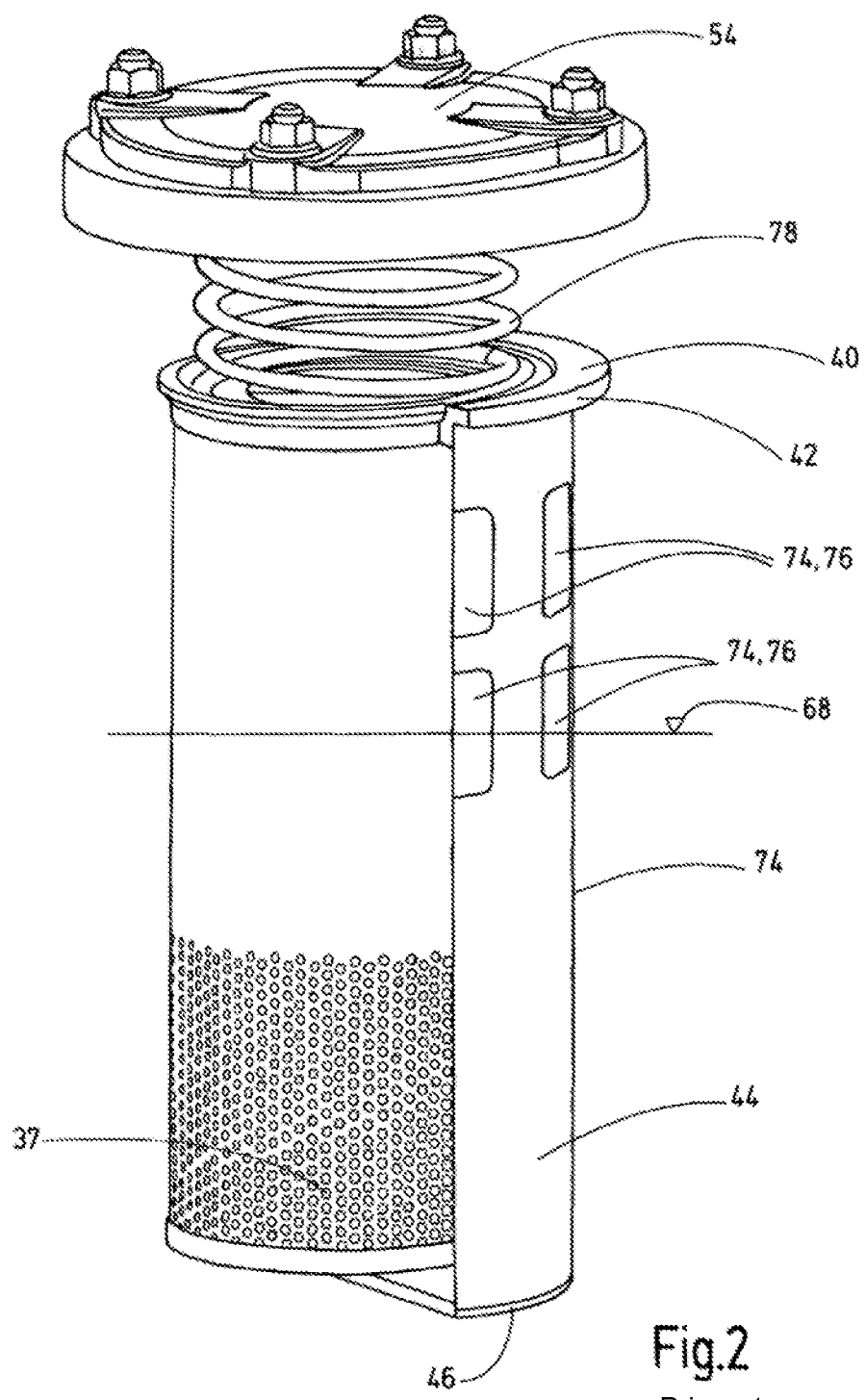
FIG. 2 is a perspective view, partially cut open, of an additional exemplary embodiment of the filter device according to the prior art, which nevertheless corresponds as much as possible to the embodiment according to FIG. 1.

The exemplary embodiment according to FIG. 2 is changed compared with the embodiment according to FIG. 1 to the extent that a compression spring 78 is provided. Spring 78 extends between the bottom side of the cover part 54 and the housing 40 in order to press the housing 40 of the filter device against the top side of the top tank wall 12 in the case of a fixed cover part 54 to fix the filter device inside the tank 10.

As is additionally shown in FIG. 2, which at least partially relates to an external view of the filter device according to FIG. 1, window-shaped passage points 74 are provided in the housing wall 44 of the housing 40, which passage points penetrate the housing wall 44 in two groups spaced apart from one another, lie above one another in an annular manner and circulate at the circumference. The two adjacent groups have the same axial distance relative to each other. The individual passage openings 74 within a group likewise have the same distance measurements relative to each other when viewed in the radial circumferential direction. As the depictions according to FIGS. 1 and 2 additionally show, the bottom group of passage points 74 is still partially covered by the fluid level in the case of a given fluid level 68. The group lying above it ends above the level top side and without engaging in same. In the present exemplary embodiment, at least one screen structural layer or grid structural layer 76 should be arranged inside the housing wall 44 and abutting the inner side thereof, which forms a continuous cylinder sleeve and overlaps all identically formed window-shaped passage points 74 at the edge side. In order that the respective structural layer 76 remains on the inner side of the housing wall 44, it can be correspondingly fixed by a spot welding that is not depicted in detail. It is in principle also possible to stamp the screen structure into the housing wall 44 of the housing 40, so that to this extent the screen structure is an integral component of the housing wall 44. Furthermore, instead of a single structural layer 76, in principle the structural layer can however also have a separate grid, even formed multilayered, for each window opening as a passage point 74. The choice of the free opening cross sections for the passage points 74 of the respective structural layer 76 depends on the environmental conditions, such as for example the viscosity of the fluid used, in particular in the form of the hydraulic oil, which is ultimately also dependent on ambient temperature values. The presented window openings 74 as passage points in the housing 40 or in the housing wall 44 are preferably realized in a rectangular shape. However, other opening geometries are also possible in this regard.

If the filter device according to FIGS. 1 and 2 is now activated, fluid flows through the mat-shaped element material 20 from the inside towards the outside and is thereby cleaned. Because a portion of the fluid stored in the tank 10, which is situated below the level 68, flows into the bottom passage points 74, the inflow space 66 to this extent situated below the level 68 fills with fluid with the result that fluid additionally flowing in from the inner side 32 is pushed upwards. A film-shaped hollow column is then formed in the fluid flow space 66 with fluid that contacts on the inner side of the housing wall 44, and on the passage points of the perforated screen structural layer or grid structural layer 76. This rising fluid arrangement above the fluid level 68 flows out through the passage openings in the window-shaped passage points 74 that occurs in an essentially laminar manner, and splashing or foaming processes during the passage are to this extent reliably avoided. Depending on the fluid volumes encountered and the fluid pressure, as obtained by the fluid inflow in the inlet channel 16, this laminar fluid outflow can occur in the region of the fluid level 68 or above it in an appropriate manner. Depending on the volume size for the fluid flow space 66, in the case of a corresponding narrow radial layout, in other words, in the case of a small radial distance measurement, a supporting capillary effect can also be established towards the outside of the filter element 18 for the upwards movement.

Depending on the mesh size for the structural layer 76, the free opening cross sections for the passage openings can be chosen such that any gas bubbles located in the cleaned fluid, such as air bubbles, are separated at the perforated structural layer 76, with the bubbles being collected at the structural layer 76 for a close to fluid-level discharge of the gas and, for a simpler discharge, being increased in volume under the influence of their surface tension, corresponding to a coalescence effect. They then fizz, in a manner comparable with the CO2 bubbles in a carbonated beverage, upwards out of the filter device, so that to this extent the fluid in the tank 10 is effectively degased. Because hydraulic working devices are often sensitive to such a gas input, this risk of disruption is in this regard already dealt with.

In order to further improve this gas bubble discharge from the fluid, according to the invention, at least a portion of the passage openings 37 in the support tube 36 of the filter element 18 has a flow guide 80, which provides the fluid with a flow direction different from the previously described radial flow direction of the fluid from the inside towards the outside through the filter element 18.

Figure 3:
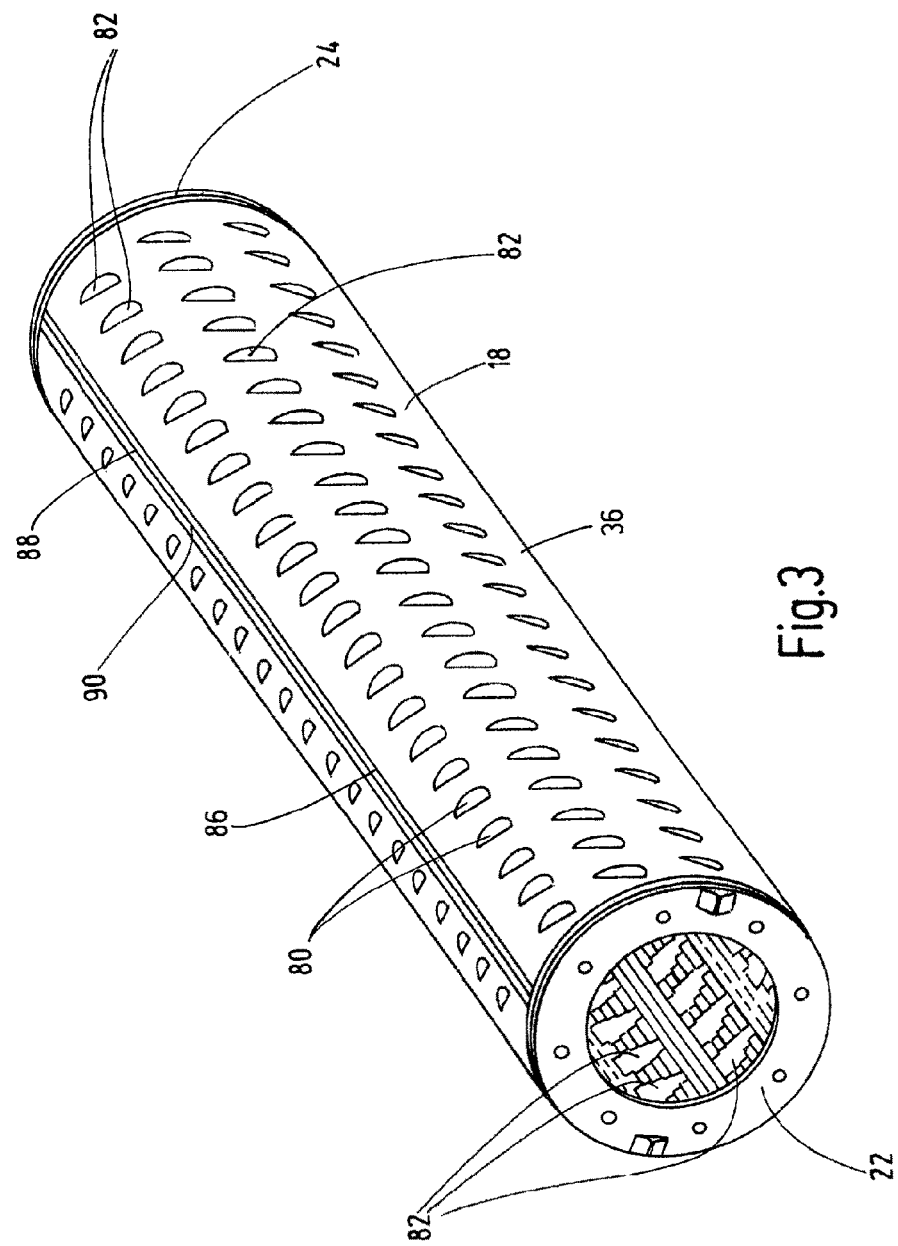
FIG. 3 is a perspective view of a filter element of the kind used for one of the filter devices of FIGS. 1 and 2 according to a first exemplary embodiment of the invention.
Figure 4:
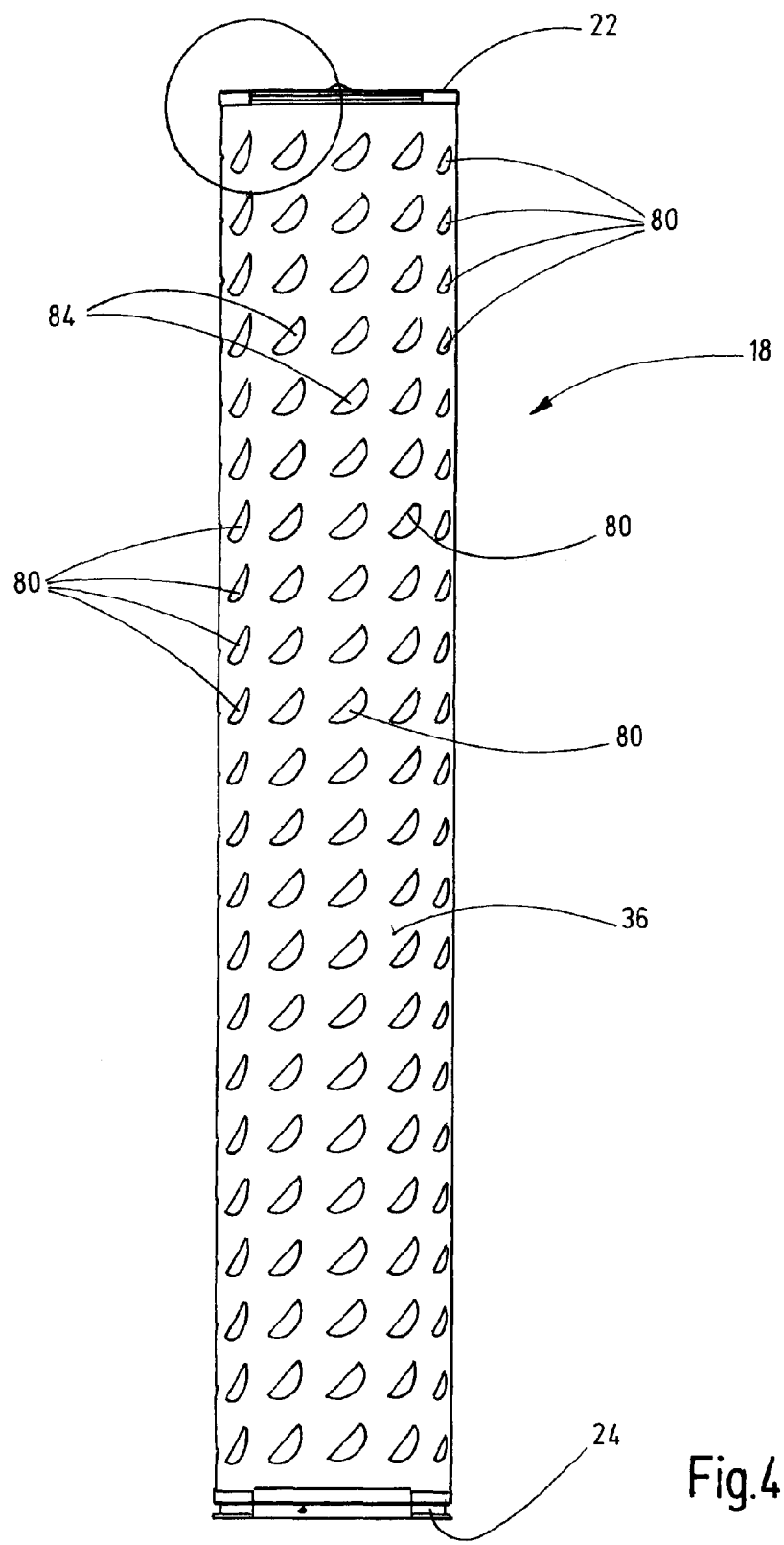
FIG. 4 is a a top view of the filter element according to FIG. 3 in the erect state.
Figure 5:
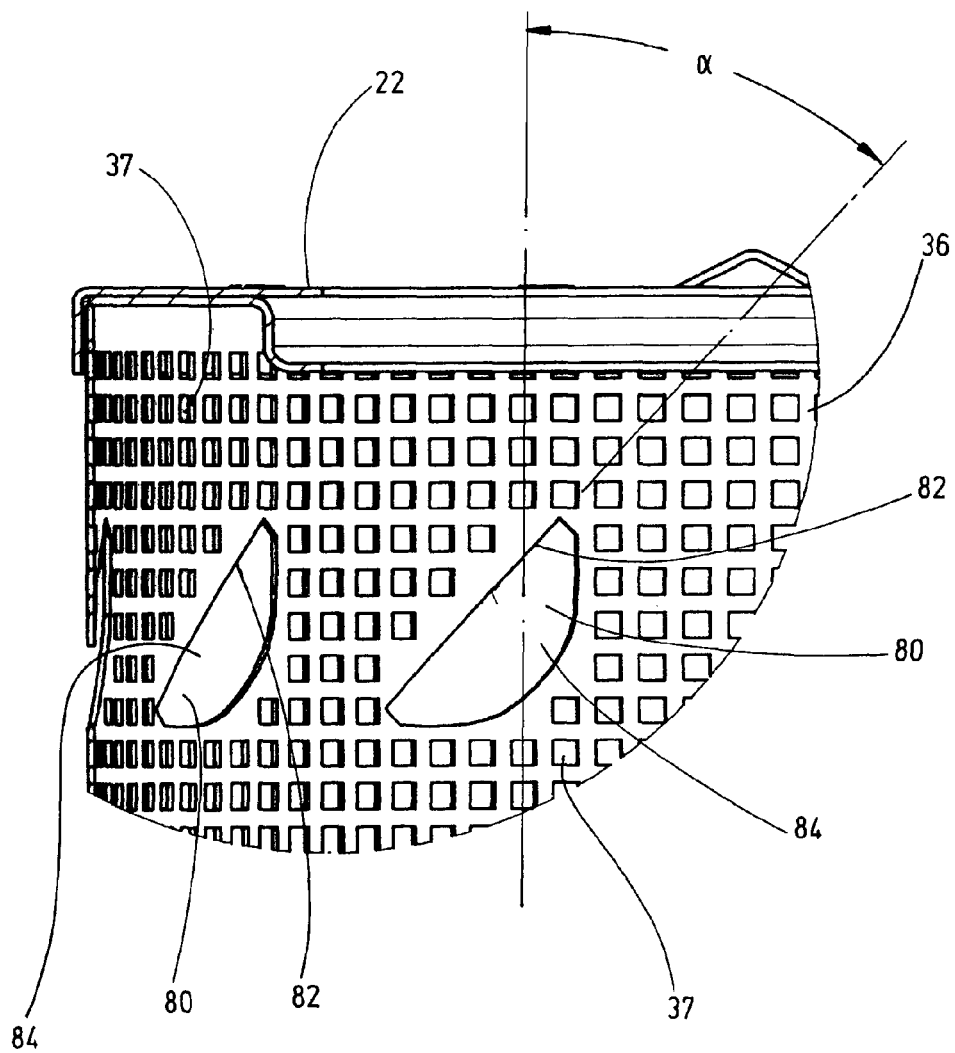
FIG. 5 is a partial top view of the notional circle depicted in FIG. 4.

As is shown in particular by the depictions according to FIGS. 3 to 5 for an exemplary embodiment of a support tube 36, the respective flow guide 80 facilitates for the fluid that passes through the support tube 36 a flow direction in the form of a swirl flow circumferentially about the support tube 36. According to the depictions of FIGS. 3 to 5, all of the flow guides 80 with their free opening cross sections 82, which can be seen only in FIG. 3, face in the same direction. This facing results in a helical swirl flow for the passage fluid. As is seen in particular from the depictions according to FIGS. 4 and 5, the respective flow guide 80 of the support tube 36 delimits a free opening cross section 82, which is inclined relative to the longitudinal axis 26 of the filter element by an angle α of preferably 45°. However, other angle settings between 30° and 60° are also conceivable to then be able to also set within the settable limits the course of the swirl flow about the filter element 18.

As is additionally shown in FIG. 3, the respective flow guide 80 is formed from the sleeve material of the support tube 36 projecting outwards as a flow pocket 84 that, up to its free opening cross section 82 transitions at its top side in an integral manner into the support tube element material. This flow pocket 84 can be formed, cut out or preferably stamped out from the support tube sleeve 85 (cf. FIGS. 6, 6a, 6b) from the inside outwards. The stamping operation can take place in such a way that, virtually automatically during formation of the flow pocket 84, the flow pocket breaks away in the top region from the support tube sleeve material 85, and then clears the slot-shaped opening cross section 82 with its surrounding edge. The pocket 84 is delimited towards the support tube 36 by the overlying sleeve material 85 of the support tube 36. As is seen from the depictions according to FIGS. 3 to 5, a swirl flow occurs with respect to the inclined position of the respective flow pocket 84 from the bottom left to the top right about the angle α of 45° relative to the vertical, which swirl flow is guided clockwise about the filter element 18.

In addition to the respective flow guide 80, the support tube 36 has additional passage openings 37, which surround the respective flow guide 80 in groups, with the total of the free opening cross sections 82 of flow guides 80 being smaller than that of the other passage openings 37 in the support tube 36. These conditions can be seen in particular from the sectional drawing according to FIG. 5. The additional passage openings 37 in the support tube 36 are formed in the form of a perforation that, by contrast with the solution according to FIG. 2 of the prior art, do not form circular passage openings, but are instead, as is shown in FIG. 5, are formed rectangular. These passage openings 37 of the support tube 36 ensure that, during the filter operation of the device, an undesirable increase in the resistance on the discharge side of the element material 20 does not take place due to an in principle closed support tube surface, which resistance increase could limit the filtration operation with the pleated filter mat. FIG. 5 additionally shows how the cylindrical support tube sleeve 36 is connected, in particular crimped, to the top end cap 22.

As is additionally shown in FIG. 4, the flow guides 80 in the support tube 36 are arranged in groups at the same height relative to one another and are grouped continuously at constant settable distances about the support tube 36.

The filter element 18 shown in FIGS. 3 and 4 as an exchangeable element comprises the element material 20 extending between the two end caps 22, 24 that, as already described, is enclosed by the support tube 36 with the passage openings 37. At least a portion of these passage openings 37 in the support tube 36 of the filter element 18 has the flow guide 80, which provides the fluid with a flow direction different from the radial flow direction through the element material 20 from the inside towards the outside. If this filter element is correspondingly contaminated with particulate matter, it can be, as already disclosed for FIG. 1, exchanged in a simple manner for a corresponding new element.

The following exemplary embodiment according to FIGS. 6, 6a, 6b and 7 is explained only to the extent that is differs substantially from the preceding exemplary embodiment of a support tube 36 with flow guides 80. In the embodiment according to FIG. 6, the opening cross sections 82 of the individual flow guides 80 are inclined in the other direction, i.e., they extend at an angle α inclined 45° relative to the longitudinal axis 26 of the filter element 18, viewed in the viewing direction of FIGS. 6 and 7 from the top left to the bottom right. Furthermore, the support tube 36 is depicted according to the depiction of FIG. 6 in its uncoiled situation as a flat sheet blank that, correspondingly rolled up to form a circular cylinder, forms a common welded longitudinal seam 90 with its two opposite longitudinal edges 86, 88.

FIGS. 6a, 6b additionally show along the arrows X and Y end and side views of the uncoiled support tube 36 in the form of its flat sleeve 85. In particular, this illustration shows the pocket design for the individual flow guides 80 in the support tube sleeve. Due to the opposite orientation of the opening cross sections 82 for the flow guide 80, the swirl flow thus takes place counterclockwise about the filter element 18, viewed in the longitudinal orientation thereof. Depending on how one wishes to configure the flow resistance inside the support tube sleeve 85, it is also possible to provide more pocket-shaped flow guides 80, and reduce the number of radial passage points 71 in the form of a perforation.

The flow pockets 84 in the form of projecting gills on the support tube 36 or, in other words, the flow guides 80, can be uniformly distributed over the entire external circumference of the support tube 36 as described above. In the case of embodiments that are not depicted in detail, it is however possible to distribute these flow pockets 84 over the circumference of the support tube 36 in a different arrangement. For example, the flow pockets 84 could be grouped in the manner of a cluster arrangement about the support tube 36. It has been proven to be particularly advantageous to arrange the flow pockets 84 or the flow guide 80 below the fluid level to be expected inside the supply tank on the support tube 36. The gill-shaped flow guides 80 and the flow pockets 84 are then preferably exclusively arranged in the bottom third of the support tube 36 viewed in the viewing direction of FIGS. 1 to 4. Otherwise, the support tube 36 is formed as a full sleeve or provided with the already described passage openings 37 in a rectangular shape or another multisided shape and circular or elliptical.

Thanks to the swirl flow set by the respective flow guide of the support tube, in a guided manner the fluid with the air input arrives via the cylindrically designed fluid flow space 66 at the window-shaped passage points 74 in the housing 40, which flow space surrounds the support tube 36, which then leads in a surprising manner to an increased gas output to the window-shaped passage points 74 of the housing 40 caused by the higher energy input of the swirl flow into the fluid to be carried along. The flow guides 80 that project, in the manner of gills, upwards in the direction of the fluid level 68 permit a direct discharge of the fluid or oil mixed with air in the direction of the fluid level 68 and beyond, which further promotes the air discharge. There is no equivalent of this solution in the prior art.

While various embodiments have been chosen to illustrate the invention, it will be understood by those skilled in the art that various changes and modifications can be made therein without departing from the scope of the invention as defined in the appended claims.

What is claimed is:

1. A filter device, comprising:
   a filter housing being mountable in a fluid supply tank and having a housing wall with a plurality of fluid passage points;
   a filter element being mounted in said filter housing and having an element material though which fluid to be filtered can flow from an inside of said element material to an outside of said element material in a radial flow direction relative to a longitudinal axis of said element material;
   a fluid inlet in direct fluid communication with said inside of said element material;
   a support tube enclosing said element material and being surrounded at a radial distance by said housing wall defining a flow space radially between said support tube and said housing wall relative to said longitudinal axis; and
   first and second passage openings in said support tube, each of said first passage openings having a flow guide providing filtered fluid passing therethrough with a flow direction different from the radial flow direction and with a swirl flow only circumferentially and axially about said support tube in said flow space such that the filtered fluid only flows circumferentially and axially about said support tube throughout said flow space from said first passage openings.

2. A filter device according to claim 1 wherein the swirl flow is directed counterclockwise.

3. A filter device according to claim 1 wherein each said flow guide has a free opening cross section facing in a same direction.

4. A filter device according to claim 1 wherein each said flow guide delimits a free opening cross section inclined relative to said longitudinal axis by an angle of 30 to 60 degrees.

5. A filter device according to claim 1 wherein each said flow guide delimits a free opening cross section inclined relative to said longitudinal axis by an angle of 45 degrees.

6. A filter device according to claim 1 wherein each said flow guide is formed from material of said support tube and projects radially outwardly relative to said longitudinal axis as a flow pocket, a top edge of each said flow pocket delimiting a free opening cross section for discharge of the filtered fluid from each said flow guide.

7. A filter device according to claim 6 wherein each said flow guide is formed or stamped out from said support tube from an inside of said support tube to an outside of said support tube.

8. A filter device according to claim 6 wherein said second passage openings do not have said flow guides and surround respective ones of said flow guides in groups of said second passage openings, a total area of said free opening cross sections of said flow guides being equal to or smaller than a total area of free opening cross sections of said second passage openings.

9. A filter device according to claim 1 wherein said flow guides are grouped on said support tube at equal heights relative to the longitudinal axis and are spaced from one another at equal distances about said support tube.

10. A filter device according to claim 1 wherein said filter housing comprises an unfiltered fluid inlet in direct fluid communication with a fluid cavity inside said element material.

* * * * *